May 7, 1935.  C. L. BABB  2,000,874
PUMP UNIT
Filed June 14, 1933
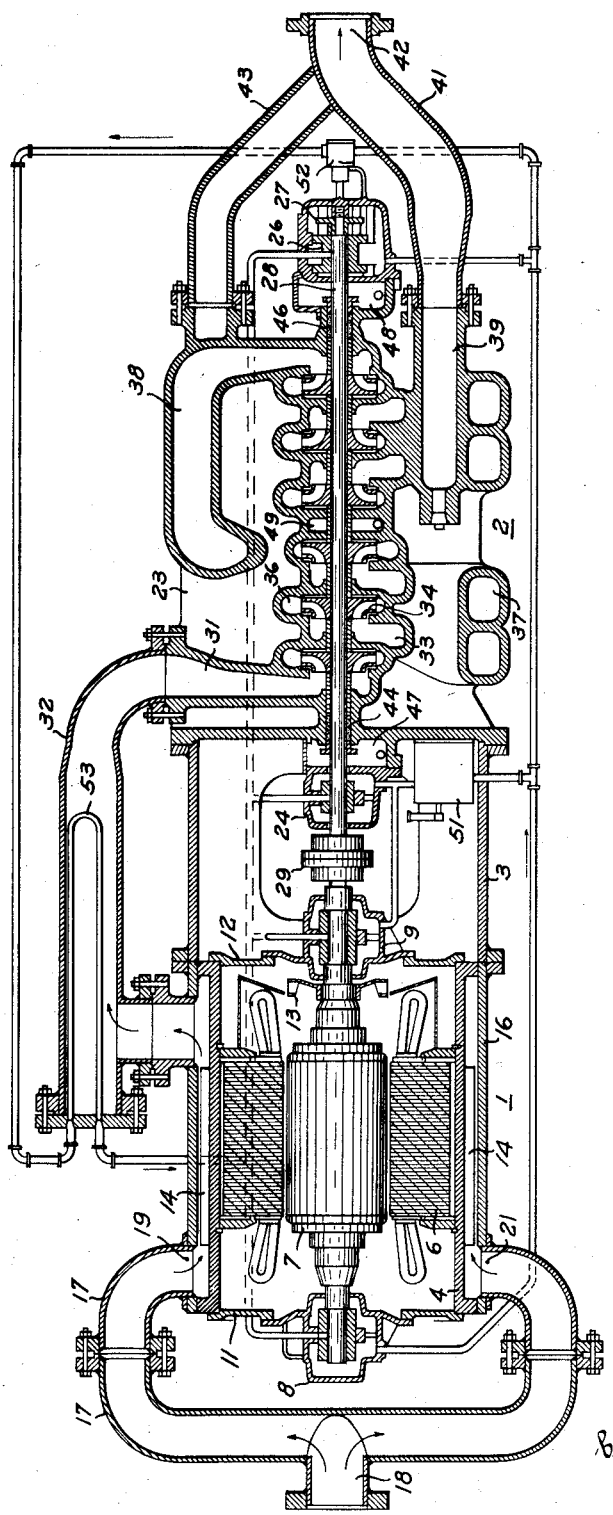

Patented May 7, 1935

2,000,874

UNITED STATES PATENT OFFICE 2,000,874

PUMP UNIT

Charles L. Babb, Milwaukee, Wis., assignor to Allis-Chalmers Manufacturing Company, Milwaukee, Wis., a corporation of Delaware Application June 14, 1933, Serial No. 675,666

5 Claims. (Cl. 103—87)

This invention relates to improvements in fluid pumping units and more particularly to units in which the fluid to be displaced is utilized to cool the operating means of the pump.

In pumping units driven by electric motors, it is advantageous to cool the motor by the fluid to be displaced to thereby obtain intense cooling of the motor which permits increase in the rating thereof. The motor then can be totally enclosed and is thereby suited for outdoor operation without a protective cover or housing. It is necessary that a unit of such character be entirely self-contained and such unit is therefore preferably provided with a complete built-in lubricating system. The bearings of the unit should be accessible and such bearings as well as the rotor of the motor should be removable from the unit without necessitating dismounting of the cooling jacket of the motor and with the minimum of disturbance to other portions of the unit. The bearings of the unit should also preferably be so located as to be protected from injury due to forces external to the unit during transportation thereof. The pump is preferably of a type in which the end thrust is compensated to reduce the duty of the thrust bearing and thereby to reduce the possibilities of failure of the unit during operation thereof.

It is therefore among the objects of the present invention to provide an electric motor driven fluid pumping unit in which the motor is totally enclosed and is cooled only by the fluid to be displaced.

Another object of the invention is to provide a motor driven pumping unit in which all of the bearings are protected from injury by forces external to the unit.

Another object of the invention is to provide a motor driven pumping unit in which only the minor operating portions of the structure are exposed and are accessible without disassembly of the unit.

Another object of the present invention is to provide a motor driven fluid pumping unit in which all of the bearings of the motor and of the pump are accessible without disturbance of the fluid conveying portions of the unit.

Another object of the present invention is to provide an electric motor driven fluid pumping unit in which the motor armature and the bearings for the armature may be removed without dismounting the cooling jacket of the motor.

Another object of the present invention is to provide a motor driven pumping unit having a lubricating pump driven by the motor for supplying lubricant under pressure to the bearings of the unit from a lubricant reservoir.

Another object of the present invention is to provide a motor driven pumping unit in which the lubricant for the bearings of the motor and of the pump is cooled by the fluid to be displaced.

Another object of the present invention is to provide a motor driven rotary pumping unit in which the fluid leaking past the sealing means of the pump is collected and returned to the fluid line.

Objects and advantages, other than those above set forth, will be apparent from the following description when read in connection with the accompanying drawing which illustrates one embodiment of the present invention partially in longitudinal cross-section.

Referring more particularly to the drawing by characters of reference, reference numeral 1 generally designates an electric motor of any type known in the art, the type being generally determined by the nature of the source of current available for the supply of such motor. Motor 1 drives a rotary pump generally designated by 2 and which is preferably of the centrifugal type. Motor 1 and pump 2 are connected by hollow cylindrical member 3 preferably of the same diameter as the diameter of the motor and pump casings which member maintains the motor and the pump in proper alinement. The motor and pump as a unit may thus be rested directly on a foundation without the interposition of the bed-plate usually necessary for maintaining the pump and the motor in the proper alinement. Motor 1 is provided with a housing 4 of substantially cylindrical shape and preferably made of forged steel and contains the stator 6 of the motor. The rotor or armature 7 of the motor is rotatably supported in bearings 8 and 9 mounted in covers 11 and 12 secured to housing 4 in air tight relation therewith. As will appear hereinafter, the cooling of the motor is effected through the outer surface of housing 4, thereby providing for direct cooling of stator 6 as a result of the contact of stator 6 with housing 4 which is substantially surrounded by the fluid being pumped. A fan 13 mounted on the shaft of the motor is provided to circulate air around rotor 7 and over the inner surface of housing 4 to provide for the transmission of heat liberated in rotor 7 to the fluid flowing over housing 4. The outer surface of housing 4 is provided with longitudinal cooling fins 14 and is surrounded by a jacket 16 secured to housing 4 in fluid tight relation therewith.

The fluid to be propelled is drawn through a suction pipe 17 having an inlet opening 18 preferably coaxial with the motor. Pipe 17 is divided into a plurality of branches connected with jacket 16 through lateral opening such as 19 and 21, a portion of the branches, at least, being preferably welded to a jacket 16. Such construction avoids the use of the large removable seal which would be necessary if pipe 17 were actually connected with the space defined by housing 4 and jacket 16. The several branches of pipe 17 also constitute a guard protecting bearing 8 from possible injuries from external forces and objects during transportation and operation of the unit. Each branch of pipe 17 is preferably constituted of a plurality of portions so bent and provided with suitable flanges as to permit removal of a portion of pipe 17 when it is desired to remove bearing 8, cover 11 and rotor 7 of motor 1 for inspection or repairs. Such removal may then be effected without disturbing jacket 16 or the portions of the inlet pipe connected therewith.

Jacket 16 is directly connected by cylindrical member 3 with the casing 23 of centrifugal pump 2. Casing 23 supports journal bearings 24 and 26 and a thrust bearing 27 for the impeller shaft 28 of the pump. In the present embodiment, bearing 26 and thrust bearing 27 are assembled in a common housing. Motor shaft 28 is connected with the shaft of motor 1 by means of a flexible coupling 29 which permits smooth running of the unit irrespective of any misalinement of rotor 7 and of shaft 28 resulting from inaccuracies in the different bearing. Casing 23 is provided with an inlet passage 31 connected with jacket 16 through a heat exchanger 32, the purpose of which will appear hereinafter. From inlet passage 31, the fluid progresses in an axial direction through one or more pumping stages, each stage comprising an inlet passage 33 leading to an impeller 34 fixedly mounted on shaft 28 from which the fluid issues into a discharge passage 36 connected with the inlet passage of the next stage by a passage 37. After passing through the first group of stages, the fluid is conducted by way of a passage 38 to the inlet passage of the first stage of a second group of stages wherein the fluid progresses axially in a direction opposite to the direction of progression in the first group of stages. Where the above method of stage arrangement is used, the thrust exerted on the shaft by the reaction of the fluid is substantially balanced and the duty of the thrust bearing is thereby substantially reduced. The fluid issues from the last stage of the pump at substantially mid-length of casing 23 into a discharge passage 39 which preferably extends parallel to the axis of the pump and is so located as to be surrounded by the inlet passages of the second group of stages of the pump. The fluid is discharged from passage 39 into a discharge pipe 41 having the outlet opening 42 thereof preferably located coaxially with pump 2, motor 1 and inlet opening 18. Such a construction permits installation of the unit in place of a portion of the pipe containing the fluid to be propelled thereby requiring a minimum amount of space for the installation of the pump. Discharge pipe 41 is supported against casing 23 by a brace or braces 43. Pipe 41 and brace 43 then constitute a guard which protects bearings 26 and 27 from possible injury during transportation or operation of the unit. Shaft 28 is sealed against casing 23 by suitable means such as stuffing boxes 44 and 46 having receptacles 47 and 48 associated therewith which collect any fluid leaking through the stuffing boxes. The two groups of stages are separated by a chamber 49 which collects any fluid tending to leak from the pump casing between the groups of stages under a pressure head which is equal to substantially one-half of the pressure head produced by the entire pump. The fluid accumulating in chambers 47, 48 and 49 is drained from the chambers by suitable means (not shown) and returned to the fluid line.

The lubricant for the bearings of the unit is supplied from a reservoir 51 which is preferably mounted within cylindrical member 3 and from which the lubricant is circulated to the several bearings through a suitable piping system by means of a pump 52 driven by motor 1 and herein shown as being mounted at the outboard end of shaft 28. Pump 52 circulates the lubricant through a pipe 53 which is a part of heat exchanger 32 in which the heat removed from the bearings by the lubricant is dissipated to the fluid to be propelled. From pipe 53 the lubricant is distributed to the several bearings of the unit and is returned to reservoir 51 by suitable piping.

It will be appreciated that, as a result of the construction herein described, the pumping unit contains only a small number of exposed moving parts which are adequately protected by cylindrical member 3 and the inlet and outlet pipes. Such moving parts are accessible through apertures in such member which apertures may be entirely closed by suitable covers to protect such moving parts from the effect of weather. Lubrication of the unit is automatically maintained as long as the unit is in operation and needs no attention other than initial provision of an adequate supply of lubricant in reservoir 51. The unit, due to elimination of a base plate, is light in weight and may be installed on foundations of minimum dimensions. All the bearings of the unit are accessible for inspection and removal thereof without disassembly of the unit, and the rotor of the motor may be removed with a minimum amount of difficulty incident to the weatherproof construction of the motor. The stator of the motor is intensely cooled by direct contact of such stator with the cooling fluid through the wall of housing 4 and only the losses of rotor 7 need be transferred to housing 4 by means of air circulated by a fan 13 of reduced dimensions. The windage losses are therefore considerably reduced as compared to the windage losses in a rotor wherein the heat dissipated in the stator must also be removed by air circulation. The cooling of the motor is thus obtained at the highest rate possible and the rating of the motor may therefore be increased for a given size of the motor. The cooling of the lubricant from the several bearings permits operation of such bearings with a minimum danger of failure thereof during operation of the unit. The entire unit may be built, assembled, and tested in the factory before shipment with a minimum expenditure of time and with the minimum of difficulty.

Although but one embodiment of the present invention has been illustrated and described, it will be apparent to those skilled in the art that various changes and modifications may be made therein without departing from the spirit of the invention or from the scope of the appended claims.

It is claimed and desired to secure by Letters Patent:

1. In a fluid pumping unit, an electric motor having a fluid tight housing inclosing a stator and a rotor and bearings for said rotor arranged externally of the housing, a jacket coaxially surrounding said housing in sealing engagement therewith, a suction pipe discharging into said jacket and constituting a guard for one of said bearings, a pump having a shaft driven by said motor and having a casing, journal and thrust bearings for said shaft, said bearings being arranged externally of the casing thereof, means for connecting said casing with said jacket in alinement therewith, means for conducting fluid from said jacket to the inlet of said pump, and a discharge pipe for said pump, said discharge pipe constituting a guard for one of said journal bearings and for said thrust bearing.

2. In a fluid pumping unit, an electric motor having a fluid tight housing inclosing a stator and a rotor and bearings for said rotor, a jacket coaxially surrounding said housing in sealing engagement therewith, a suction pipe discharging into said jacket, a pump having a shaft driven by said motor and having a casing and bearings for said shaft, said bearings being arranged externally of said casing, a reservoir for lubricant, a pump driven by said motor and supplying lubricant to said bearings from said reservoir, means for connecting said casing in alinement with said jacket, said reservoir being arranged within said connecting means, means for conducting fluid from said jacket to the inlet of said pump, and a discharge pipe for said pump, said discharge pipe forming a guard for said lubricant pump.

3. In a fluid pumping unit, an electric motor having a fluid tight housing inclosing a stator and a rotor and bearings for said rotor, a jacket coaxially surrounding said housing in sealing engagement therewith, a suction pipe discharging into said jacket, a pump having a shaft driven by said motor and having a casing and bearings for said shaft, said bearings being arranged externally of said casing, means for connecting said jacket in coaxial alinement with said pump casing, a reservoir for lubricant, said reservoir being arranged within said connecting means, a pump driven by said motor and supplying lubricant to said bearings from said reservoir, a heat exchanger having a passage connecting said jacket to the inlet of said pump and having another passage connecting said lubricating pump with said bearings, and a discharge pipe for said pump, said suction and said discharge pipes forming guards for exposed portions of the lubricating system.

4. In a fluid pumping unit, an electric motor having a fluid-tight housing enclosing the stator and the rotor thereof and bearings for said rotor arranged externally of the housing, a jacket coaxially surrounding said housing in sealing engagement therewith, a suction pipe discharging into said jacket and constituting a guard for one of said bearings, a pump having a shaft driven by said motor and having a casing and having journal and thrust bearings for said shaft, all of said bearings being arranged externally of said pump casing and being removable without interference from and with said motor housing and said pump casing, means for connecting said casing with said jacket in alinement therewith, means for conducting fluid from said jacket to the inlet of said pump, and a discharge pipe for said pump, said discharge pipe constituting a guard for one of said journal bearings and for said thrust bearing.

5. In a fluid pumping unit, an electric motor having a housing enclosing a stator and a rotor, said housing having end portions removable separately from other portions thereof, bearings for said motor supported only by the end portions of said housing, a jacket coaxially surrounding said housing in sealing engagement therewith, a suction pipe discharging into said jacket, a pump having a shaft driven by said motor and comprising a casing and journal and thrust bearings for said shaft, all of said bearings being arranged externally of the casing of said pump and being removably attached thereto, means for connecting said casing with said jacket in alinement therewith, means for conducting fluid from said jacket to the inlet of said pump, and a discharge pipe from said pump, said suction and said discharge pipes constituting separate guards for the bearings arranged at the ends of the unit.

CHARLES L. BABB.